United States Patent
Reynolds

[11] Patent Number: 6,153,573
[45] Date of Patent: Nov. 28, 2000

[54] AQUEOUS COMPOSITION FOR PLASTICIZING PAINT PRIOR TO STRIP

[75] Inventor: Paul A. Reynolds, Winford, United Kingdom

[73] Assignee: Eco Solutions Limited, North Somerset, United Kingdom

[21] Appl. No.: 09/101,407

[22] PCT Filed: Dec. 23, 1996

[86] PCT No.: PCT/GB96/03219

§ 371 Date: Sep. 11, 1998

§ 102(e) Date: Sep. 11, 1998

[87] PCT Pub. No.: WO97/24409

PCT Pub. Date: Jul. 10, 1997

[30] Foreign Application Priority Data

Dec. 28, 1995 [GB] United Kingdom ................... 9526584
Apr. 29, 1996 [GB] United Kingdom ................... 9608944
Aug. 1, 1996 [GB] United Kingdom ................... 9616154

[51] Int. Cl.[7] ............................... C09D 9/04; B01F 17/14
[52] U.S. Cl. ..................... 510/203; 510/206; 510/417; 516/76; 516/199; 134/38
[58] Field of Search .................. 516/76, 56, 199; 510/201, 202, 203, 206, 417; 134/38

[56] References Cited

U.S. PATENT DOCUMENTS

| | | | |
|---|---|---|---|
| 4,070,510 | 1/1978 | Kahn | 427/385.5 |
| 4,071,645 | 1/1978 | Kahn | 427/340 |
| 4,769,170 | 9/1988 | Omori et al. | 510/170 |
| 4,927,556 | 5/1990 | Pokorny | 510/203 |
| 5,246,503 | 9/1993 | Minick | 134/38 |
| 5,348,680 | 9/1994 | Maitz | 510/188 |
| 5,382,376 | 1/1995 | Michael et al. | 510/413 |
| 5,560,806 | 10/1996 | Li et al. | 162/5 |
| 5,565,136 | 10/1996 | Walsh | 510/203 |

FOREIGN PATENT DOCUMENTS

| | | |
|---|---|---|
| 0 052 275 | 5/1982 | European Pat. Off. . |
| 0 294 041 | 12/1988 | European Pat. Off. . |
| 0 376 687 | 12/1989 | European Pat. Off. . |
| 0 389 829 | 10/1990 | European Pat. Off. . |
| 0 422 271 A1 | 1/1991 | European Pat. Off. . |
| 0 407 952 B1 | 2/1994 | European Pat. Off. . |
| 0 590 722 | 4/1994 | European Pat. Off. . |
| 0 648 820 A2 | 10/1994 | European Pat. Off. . |
| 3438399 C1 | 10/1984 | Germany . |
| 57-83598 | 11/1980 | Japan . |
| 1229778 | 8/1969 | United Kingdom . |
| WO 09/08603 | 2/1989 | WIPO . |
| WO 92/05224 | 9/1991 | WIPO . |
| WO 93 07227 | 4/1993 | WIPO . |
| WO 94/17143 | 1/1994 | WIPO . |
| WO 94/29392 | 12/1994 | WIPO . |

*Primary Examiner*—Richard D. Lovering
*Assistant Examiner*—Daniel S. Metzmaier
*Attorney, Agent, or Firm*—Welsh & Katz, Ltd.

[57] ABSTRACT

A predominantly aqueous composition for plasticising or softening paint, varnish and similar coatings prior to stripping the coating from a surface includes preferably a combination of the active agents triethylphosphate and a co-agent selected from dimethyl adipate, 1,2,3-propanetriol triacetate, tri-n-butyl citrate, n-octyl acetate, methyl octanoate and 2-ethyl-l-butanol, as an emulsified hydrophobic phase in which the actives are partitioned between the hydrophobic and aqueous phases. The emulsion is preferably stabilized using a non-ionic water-soluble block copolymer surfactant, being a copolymer of more than one alkaline oxide. The composition may be thickened using a rheology control agent. Synthetic smectic clays are particularly suitable. The composition is non-toxic and consists predominantly of water, and yet exhibits effective paint, varnish and lacquer plasticising/softening characteristics.

25 Claims, 1 Drawing Sheet

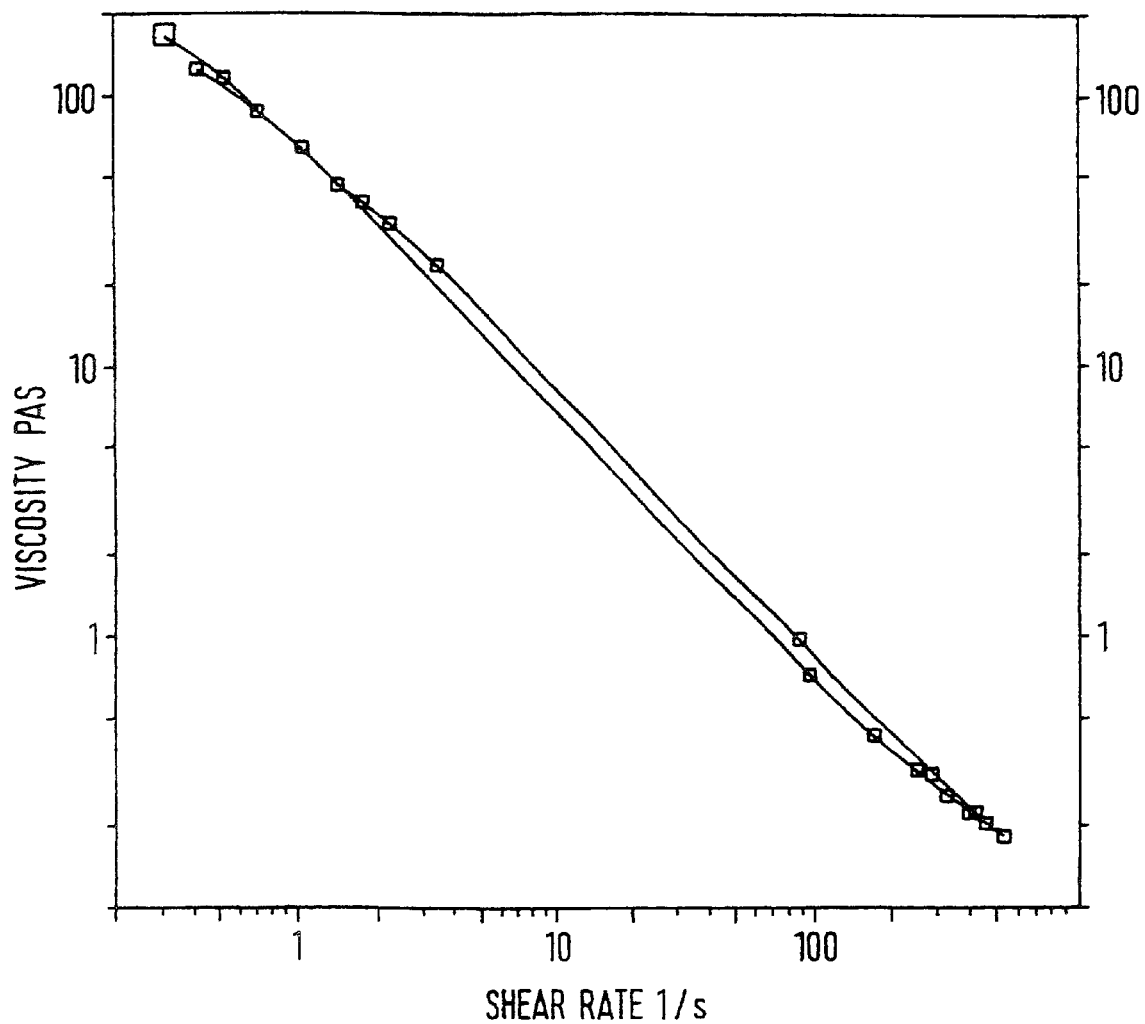
FIGURE

AQUEOUS COMPOSITION FOR PLASTICIZING PAINT PRIOR TO STRIP

FIELD OF THE INVENTION

The present invention relates to an aqueous composition for plasticising or softening paint, varnish and similar coatings (e.g. lacquers) prior to stripping the coating from a surface.

PRIOR ART

Solvent-based compositions are known, for plasticising or softening paint, varnish and similar coatings prior to stripping. The composition is applied to the coating, for example by brush application, is then left for a period of time to allow the composition to plasticise or soften the coating to a desired extent, and then the stripping operation is carried out mechanically. Such compositions, and the fumes they emit, are generally irritant, smelly and toxic. This necessitates special storage and handling procedures, particularly for commercial use, as well as protective clothing and equipment for users. Moreover, the compositions are liquid at room temperatures, which means that it is difficult for them to work effectively on vertical surfaces.

Efforts have been made to provide aqueous compositions having effective softening and degrading actions, which could replace solvent-based systems.

DE-A-3438399 (Example 1) describes such an aqueous composition, containing a total of 66% by weight dibasic acid esters (dimethyl succinate, dimethyl glutarate and dimethyl adipate), 2% by weight of an organic thickening agent (cellulose acetobutyrate) and 5% by weight of water, together with additional ingredients such as surfactants. Such a composition is described as softening and moistening a paint coating after 2 hours, sufficiently for it to be completely removed by steam jet blasting, with the softening and moistening effect being retained for at least 24 hours after application.

EP-A-0294041 describes further aqueous compositions, containing up to about 50% by weight dibasic acid esters, small amounts of thickening agents (clay/cellulose mixtures) and at least about 50% by weight water, together with additional ingredients such as surfactants. Such compositions were tested in comparison with a methylene chloride paint stripper (Comparative Example A) and the known composition from DE-A-3438399 (Comparative Example B), for their ability to remove four layers of paint from a pine board. With the board horizontal (Table II), only the methylene chloride stripper removed all four layers, and only one of the eight tested compositions performed better—and then only slightly better—than the known composition from DE-A-3438399. The performance was found to be retained with the board in a vertical orientation.

However, the compositions of EP-A-0294041 do not provide a significant improvement in practical commercial terms. There is a tendency for the compositions to dry out and/or to separate out when left on the surface to be treated, so reducing their effectiveness. In addition, the compositions are not clear enough to be able to see the coating after the composition has been applied, so that it can be difficult to judge when the softening action has proceeded sufficiently.

EP-A-0407952 describes viscous, pasty or gel-like aqueous compositions, said to be improvements on the compositions of EP-A-0294041, in which the paint-softening "solvents" generally comprise 20 to 60% by weight of the composition, preferably 30 to 45%, the remainder of the composition being an aqueous solution of common surfactants with one or more common thickeners. Dibasic esters are generally indicated as possible "solvents", although none is specifically mentioned. Laponite RD is exemplified (Examples G, H and I) as an example of a common thickener.

The compositions of EP-A-0407952 do not provide a significant improvement in practical commercial terms. The viscosity of the compositions is not particularly high, notwithstanding the rather low water content (about 50% by weight is exemplified). The compositions contain too much organic material, and too many individual organic components, to be feasible from either an environmental or commercial point of view.

EP-A-0648820 describes further aqueous compositions employing rather low levels of water and high levels of active and carrier organics dispersed in the water by means of surfactants. As potential surfactants there are generally mentioned alkylene-oxide (ethylene oxide or propylene oxide)-added type nonionic surface active agents.

The known aqueous compositions overcome some of the disadvantages of the former solvent-based compositions, but there nevertheless remains a need for improved or at least alternative aqueous plasticising or softening compositions.

More particularly, there remains a need for an aqueous composition which can work at least as well as known methylene chloride strippers, and in which water forms the major portion of the composition.

BRIEF DESCRIPTION OF THE DRAWING

The drawing comprises a graph of viscosity vs. shear rate of the formulation of the subject invention.

DESCRIPTION OF THE INVENTION

According to a first aspect of the present invention, there is provided an aqueous composition for plasticising or softening paint, varnish and similar coatings prior to stripping the coating from a surface, the composition comprising:

(a) an effective amount of a non-toxic plasticising/softening compound or mixture forming an emulsion in the composition;

(b) an effective amount of at least one surfactant to allow the composition to exist as a stable emulsion, the surfactant(s) being selected from nonionic water-soluble block copolymers of more than one alkylene oxide; and (c) water in an amount sufficient to comprise the major portion of the composition.

The component (a) forms an emulsion in the composition. It is not necessary for component (a) to be completely insoluble in water, however, provided that the stable emulsion can be maintained. Indeed, as discussed in more detail below, it can be preferred that part of component (a) partitions between the emulsified and aqueous phases.

It should be noted that the phrase "stable emulsion" used herein refers particularly to an emulsion which is stable with respect to separation into unemulsified phases over a period of time normally required for such a composition, typically a few weeks or months. The word "emulsion" includes suspensions and dispersions. In particular, the emulsion, unless thickened by a rheology control agent as described below, may sediment on standing, but because of its stability with respect to phase separation will be readily redispersed for use by simple stirring or shaking.

The compound or mixture of component (a) may be selected from any conventional compounds, particularly organic compounds, capable of plasticising or softening the desired coating. Such compounds are listed extensively in the prior art documents acknowledged above, the disclosures of which are incorporated herein by reference. In certain of those disclosures, plasticising/softening compounds are referred to as "solvents", by reason of the fact that the act of plasticising or softening a coating can be regarded as a partial dissolution of the coating.

In one preferred form, the compound or mixture of component (a) may be selected from:

(a1) at least one non-toxic compound of formula I

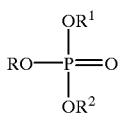

wherein R, $R^1$ and $R^2$, which may be the same or different, represent lower alkyl, phenyl or lower alkyl-phenyl groups;

(a2) at least one non-toxic lower alkyl ester of a $C_{2-20}$ carboxylic acid; and (a3) a mixture of (a1) and (a2).

In a second preferred form, the compound or mixture of component (a) may be selected from:

(a1) at least one non-toxic compound of formula I as defined above;

(a2) at least one non-toxic $C_{4-12}$ alkanol; and (a3) a mixture of (a1) and (a2).

The term "lower alkyl" refers in particular to alkyl groups containing up to about 8 carbon atoms, for example methyl, ethyl, n-propyl, s-propyl, n-butyl, s-butyl, t-butyl, pentyl and hexyl groups. Such alkyl groups may optionally be mono- or poly-substituted, for example by one or more substituents selected from halo, nitro, amino, $C_{1-4}$ alkylamino, di-$C_{1-4}$ alkylamino, hydroxy, $C_{1-4}$ alkoxy, carboxy, ($C_{1-4}$ alkyl) carbonyl, ($C_{1-4}$alkoxy)-carbonyl, $C_{2-4}$ alkanoyloxy, ($C_{1-4}$ alkyl)carbamoyl, aryl and cycloalkyl groups or salt derivatives thereof. Phenyl portions of compounds of formula I may optionally be similarly mono- or poly-substituted.

The expression "non-toxic" used herein refers to an acceptably low level of toxicity when a compound is present at an effective amount, and not necessarily to a complete absence of toxic effects. In particular, compounds which have only a temporary toxic effect and do no significant permanent harm, will be referred to and understood as "non-toxic" herein. Particular toxic effects which are to be avoided in the compositions of the present invention are carcinogenicity, teratogenicity and mutagenicity.

The compound of formula I forming component (a1) of the preferred composition is preferably water-soluble or water-miscible, if necessary with the assistance of solubilising agents, but insoluble or non-miscible compounds may be used provided that they are emulsifiable or suspendible in aqueous solution, if necessary with the assistance of emulsifying and/or suspending agents.

As a preferred compound of formula I there may specifically be mentioned triethylphosphate ($R=R^1=R^2=$ethyl), which is found to exhibit high activity, non-toxicity (within the above definition) and water-miscibility.

The carboxylic acid ester forming component (a2) of the preferred composition is preferably a lower alkyl ester of a straight-chain fully or partially saturated $C_{2-20}$ alkyl mono- or poly-carboxylic acid, Particularly preferred esters include alkyl esters of fully or partially saturated straight-chain mono-, di- or tribasic carboxylic acids such as, for example, $C_{2-10}$ alkanoic, alkanedioic or alkanetrioic acids, more particularly $C_{2-8}$ alkanoic acids such as acetic acid, $C_{4-8}$ alkanedioic acids such as adipic acid (hexanedioic acid) or $C_{4-8}$ alkanetrioic acids. Alkyl portions of the ester of component (a2) may optionally be mono- or poly-substituted, for example by one or more substituents selected from halo, nitro, amino, $C_{1-4}$ alkylamino, di-$C_{1-4}$ alkylamino, hydroxy, $C_{1-4}$ alkoxy and $C_{2-4}$ alkanoyloxy groups or salt derivatives thereof. Particularly preferred esters include dimethyl adipate, triacetin (1,2,3-propanetriol triacetate), tri-n-butyl citrate, n-octyl acetate and methyl octanoate.

The $C_{4-12}$ alkanol forming component (a2) of the second preferred composition is preferably a branched $C_{4-10}$ alkanol, and most preferably an alkan-1-ol having one hydroxyl function and at least one (preferably one) alkyl side chain at the 2-position. A particularly preferred such alkanol is 2-ethyl-1-butanol.

The component (a2) is typically poorly soluble or non-soluble in the aqueous composition. This component is therefore typically present mainly in the "oil" phase of the emulsion.

The surfactant component (b) is selected from nonionic water-soluble block copolymers of more than one alkylene oxide. Block copolymers of ethylene oxide and propylene oxide are particularly suitable, as these can provide a wide range of emulsification and dispersant effects, optionally functioning also as gelling agents. Such copolymer surfactants typically have an approximate molecular weight in the range of about 8000 to about 16000 (e.g. about 12000) and an approximate hydroxyl value in the range of about 5 to about 15 mg KOH/g (e.g. about 8.5–11.5 mg KOH/g). Particularly preferred are block copolymers of ethylene oxide and propylene oxide in which the proportion (x) of the polyoxyethylene hydrophile in the copolymer (expressed as a percentage by weight) is approximately related to the molecular weight (y) of the polyoxypropylene hydrophobe by the formula $$y \geq 5000 - 40x$$

Such copolymers generally have an HLB value in the range of about 20 to 28, as determined chromatographically. Water-soluble Synperonic PE (TM) surfactants (ICI, England), e.g. of the F-series (referring to their flake appearance), may be mentioned as particularly preferred surfactants of component (b).

The surfactant may suitably be used in conjunction with a cosurfactant such as a simple organic alcohol, suitably a $C_{1-10}$ alkyl alcohol, for example a $C_{4-8}$ alkanol such as hexan-1-ol. Cosurfactants improve the strength and stability of the emulsion/suspension produced by the surfactant component (b), and assist in reducing foaming of the composition.

It is most preferred, for safety reasons, that the organic components of the composition have a relatively high flash point (i.e. well above normal operating temperatures). It is also preferred, for convenience, that the organic components of the composition are liquid over the full range of normal operating temperatures.

Option (a3) of the preferred form described above has been found to provide particular enhanced and unexpected effects. More particularly, a biphasic system of components (a1) and (a2) is observed, with a certain degree of partitioning of at least one of the components between a hydrophobic ("oil") phase and the aqueous phase. The formation and nature of the biphasic system is dependent on the concentration of components (a1) and (a2) present, and the relative water-solubility of the components, but we have found that a strong activity is observed when such a system is maintained in the emulsion.

The above finding is of broad applicability. Thus, in a further aspect of the present invention, there is provided an aqueous composition for plasticising or softening paint, varnish and similar coatings prior to stripping the coating from a surface, the composition comprising: an aqueous phase including water in an amount sufficient to comprise the major portion of the composition; and an emulsified hydrophobic phase suspended in the aqueous phase, the hydrophobic phase including components (a1) and (a2) as defined above.

It is preferred that the components (a1) and (a2) are present in such concentrations that they exist in a is partitioned state between the hydrophobic and aqueous phases.

It is preferred that an effective amount of at least one surfactant is present in the composition, to allow the composition to exist as a stable emulsion.

The partitioning of the components in the biphasic system can readily be maintained when (a1) is present at an amount of about 10% by weight of total composition and (a2) is present at between about 4 and 10% by weight of total composition. The presence of the partitioned components in the biphasic system is believed to promote the swelling and softening of the coating, while preventing the composition from drying and so allowing the coating to revert to its unsoftened state.

The surfactant component, when present, is preferably, but not essentially, the nonionic water-soluble block copolymer(s) of more than one alkylene oxide, described above. A range of possible alternative water-soluble surfactants is listed in the prior art documents acknowledged above, the disclosures of which are incorporated herein by reference.

It is most preferred that the composition be in the form of a thixotropic gel or gel-like paste, which can be easily taken up on a brush and applied to the coating to be treated, whereupon when the brush is removed the composition will re-thicken on the coating, sufficiently to adhere to the coating even against the effect of gravity on a vertical surface. In this way, the composition will readily stay in contact with the coating for a sufficient length of time to allow the plasticising or softening action to proceed to the required extent. A conventional rheology control agent ("thickener") may therefore be incorporated into the composition to provide the thixotropic gel characteristics required. A range of rheology control agents is listed in the prior art documents acknowledged above, the disclosures of which are incorporated herein by reference. Such agents are typically referred to as "thickeners" in the prior art documents. Suitable rheology control agents include synthetic smectic clays composed of layered hydrous magnesium silicate free from crystalline silica. An example of such synthetic clay is a synthetic hectorite clay such as Laponite (TM) (Laporte), which is a rapid-dispersing clear and highly effective gelling agent. Fluorine-free grades of Laponite are preferred. It has been found that the combination of Laponite and the emulsion/suspension confers rheological properties on the composition which produce particularly good brush pick-up, brush application and hold-up without sagging or slumping, even at high film builds.

The composition may include additional components as desired. Such additional components may include conventional fillers, binders, stabilising agents, colorants and biocides.

The compositions of the present invention may be prepared by simple admixture. It is preferred that the water and surfactant components are mixed first, before component (a) is added. It is preferred that, where more than one compound is used in component (a), the less soluble compound(s) is/are added first to the water and any surfactant components, until an emulsion is formed. Then any more soluble compound(s) of component (a) are added, followed by the remainder (if any) of water and any rheology control agent and/or minor additional ingredients. Any co-surfactant may be added before or after component (a), or between different compounds of component (a). It is preferable to add any cosurfactant before component (a), as this is found to produce a more stable emulsion. The composition is suitably stirred during the mixing.

The water component comprises the major portion of the composition, i.e. at least about 50% by weight and/or volume, more preferably at least about 55% by weight and/or volume, still more preferably at least about 60% by weight and/or volume, still more preferably at least about 65% by weight and/or volume, still more preferably at least about 70% by weight and/or volume, still more preferably at least about 75% by weight and/or volume and most preferably about 80% by weight and/or volume. For both environmental and commercial reasons, it is desirable to use as small an amount as possible of component (a), the surfactant and any rheology control agent and/or minor additional ingredients mentioned above and as large an amount as possible of water, while still preserving the desired characteristics and properties of the composition.

Component (a) is suitably present in an amount of up to about 50% by volume of the total composition. More preferably, compounds (a1) and (a2) should both be present (a3), typically in approximately equal volumes, for example each up to about 20% by volume of the total composition, more preferably about 10% by volume of the total composition. When both (a1) and (a2) are present the composition has been found to be effective on a particularly wide range of film-forming paints, varnishes and similar coatings.

The surfactant component is typically present in an amount up to about 5% by weight of the total composition, more preferably about 1 to 2% by weight. Minor cosurfactants such as hexanol may suitably comprise up to about 20% by weight of the surfactant component, more preferably about 10% by weight.

Any minor additional components will typically comprise up to about 10% by weight of the composition, more preferably up to about 6% by weight. Where a rheology control agent is present, this will suitably be the predominant additional component, for example up to about 5% by weight of the total composition, more preferably about 4% by weight.

Industrial Applicability

The unthickened compositions of the present invention are typically characterised by a novel and highly advantageous combination of properties:

1. The compositions are excellent for use in commercial dipping tanks where large articles are treated to plasticise or soften the coatings.
2. The compositions are non-toxic, non-irritant and non-corrosive to humans, so that no or minimal health precautions are required.
3. The compositions typically maintain their moistness and volume for substantially longer than prior comparison compositions.
4. The compositions typically enable more layers of coatings to be removed, more quickly than prior comparison compositions.
5. The compositions typically exhibit excellent coating softening performance at room temperature or above, in contrast to many prior compositions which are only effective at elevated temperatures.
6. The compositions typically do not phase separate when left to stand. The shelf-life of the compositions of the present invention is excellent. Agitation to redisperse any sedimented material immediately before and/or during use is all that may be required.
7. The compositions use high levels of water, and are thereby environmentally and economically attractive.

The gel or gel-like compositions of the present invention are typically characterised by a novel and highly advantageous combination of properties:
1. The compositions exhibit a very high low-shear viscosity, typically in excess of 100 Pas at a rheometer shear rate of $1\ s^{-1}$.
2. The compositions exhibit an undisturbed yield stress typically in excess of 100 Pa, indicating a very strong and stable gel.
3. The compositions are typically thixotropic, shear-thinning to a high degree. The low-shear viscosity of over 100 Pas mentioned above declines to 1 Pas at a rheometer shear rate of $100\ s^{-1}$ and to about 0.2 Pas at a shear rate of $520\ s^{-1}$.
4. The compositions typically maintain their moistness and clingability on the coating being treated for substantially longer than prior comparison compositions.
5. The compositions typically enable more layers of coatings to be removed, more quickly and with fewer applications of composition, than prior comparison compositions.
6. The compositions typically exhibit excellent coating softening performance at room temperature or above, in contrast to many prior compositions which are only effective at elevated temperatures.
7. The compositions typically do not separate out when left on a coating overnight, in contrast to prior comparison compositions. The shelf-life of the compositions of the present invention is also substantially extended.
8. The compositions typically are sufficiently clear that the coating being treated can be seen through the composition, in contrast to prior comparison compositions.
9. The compositions use high levels of water, and are thereby environmentally and economically attractive.

In summary, it has been found that the compositions of the present invention enable paint, varnish or other coatings of a surface to be plasticised or softened with an acceptably non-toxic aqueous composition, and at an acceptably high speed, leading to significant improvements in stripping efficiency and reduced costs.

EXAMPLES

The following non-limiting Examples are included for further illustration of the invention.

Example 1

Unthickened Composition of Dimethyl Adipate/ Triethyl Phosphate

Formulation and Materials

For an approximately one litre batch the following formulation was used:

| Active compounds | |
|---|---|
| Triethyl phosphate (component a1) | 100 cm³ |
| Dimethyl adipate (component a2) | 100 cm³ |
| Surfactant (compound b)) Synperonic F127 (TM) | 10 grams |
| Co-surfactant Hexan-1-ol | 1 cm³ |
| Biocide Germaben (TM) (Blagdon Chemicals, England) | 5 cm³ |
| Other Water (component (c)) | 800 cm³ |

Method of Preparation

In a large diameter vessel 200 cm³ of the water was placed, and the hexan-1-ol added. A paddle type stirrer was started (about 300 rpm) and the Synperonic F127 was added slowly and allowed to dissolve over approximately 30–60 minutes. Care was taken to dissolve all the Synperonic F127, and the stirrer speed and depth of immersion were adjusted to minimise the amount of foam produced.

With stirring, the dimethyl adipate (DMA) was then added slowly over approximately 10 minutes, to produce an emulsion, again without undue foaming.

The triethyl phosphate was then added slowly, with stirring, over approximately 10 minutes, followed slowly by the Germaben to produce a white emulsion.

Finally, the emulsion was poured slowly and gently into a second vessel containing the reminder of the water under rapid stirring to create vortex conditions in the water. The addition of the emulsion to the second vessel took about 15 minutes, and stirring was continued for a further approximately 15 minutes to produce a good blend.

Example 2

Thickened Composition of Dimethyl Adipate/ Triethyl Phosphate

Formulation and Materials

For an approximately one litre batch the following formulation was used:

| Active compounds | |
|---|---|
| Triethyl phosphate (component a1) | 100 cm³ |
| Dimethyl adipate (component a2) | 100 cm³ |
| Surfactant (compound (b)) Synperonic F127 (TM) | 10 grams |
| Co-surfactant Hexan-1-ol | 1 cm³ |
| Biocide Germaben (TM) (Blagdon Chemicals, England) | 5 cm³ |
| Rheology Control Agent Laponite RD | 40 grams |
| Other Water (component (c)) | 800 cm³ |

Method of Preparation

In a large diameter vessel 200 cm³ of the water was placed. A paddle type stirrer was started (about 300 rpm) and the Synperonic F127 added slowly and allowed to dissolve over approximately 20–30 minutes. Care was taken to dissolve all the Synperonic F127, and the stirrer speed and depth of immersion were adjusted to minimise the amount of foam produced.

With stirring, the dimethyl adipate (DMA) was then added slowly over approximately 10 minutes, and the stirrer speed then increased to produce an emulsion, again without undue foaming.

The hexan-1-ol was added after all the DMA was added. The foam immediately disappeared and the emulsion stabilised.

The triethyl phosphate, the remainder of the water, and the Germaben were then added slowly and at the same time the stirrer speed was increased to produce a good blend.

Finally the Laponite RD was added very slowly to the vessel and into the vortex of the stirrer. A period of about 15–20 minutes was allowed for the addition. The stirrer speed was again increased to produce a good blend. At this stage it was necessary to fill the product into the containers reasonably rapidly prior to the mixture setting to a gel-like paste.

Example 3

Thickened Composition of Triacetin/Triethyl Phosphate

Formulation and Materials

For an approximately one litre batch the following formulation was used:

| Active compounds | |
|---|---|
| Triethyl phosphate (component a1) | 100 cm$^3$ |
| Triacetin (component a2) | 100 cm$^3$ |
| Surfactant (compound (b)) Synperonic F127 (TM) | 10 grams |
| Co-surfactant Hexan-1-ol | 1 cm$^3$ |
| Biocide Germaben (TM) (Blagdon Chemicals, England) | 5 cm$^3$ |
| Rheology Control Agent Laponite RD | 40 grams |
| Other Water (component (c)) | 800 cm$^3$ |

Method of Preparation

In a large diameter vessel 200 cm$^3$ of the water was placed, and the hexan-1-ol added. A paddle type stirrer was started (about 300 rpm) and the Synperonic F127 added slowly and allowed to dissolve over approximately 30–60 minutes. Care was taken to dissolve all the Synperonic F127, and the stirrer speed and depth of immersion were adjusted to minimise the amount of foam produced.

With stirring, the triacetin was then added slowly over approximately 10 minutes to produce an emulsion, again without undue foaming.

The triethyl phosphate was then added slowly, with stirring, over approximately 10 minutes, followed slowly by the Germaben to produce a white emulsion.

The emulsion was poured slowly and gently into a second vessel containing the remainder of the water under rapid stirring to create vortex conditions in the water. The addition of the emulsion to the second vessel took about 15 minutes, and stirring was continued for a further approximately 15 minutes to produce a good blend.

Finally the Laponite RD was added into the vortex of the stirrer. A period of about 15–20 minutes was allowed for the addition. Stirring was continued for about 5 to 10 minutes, after which the composition was filled into containers and allowed to thicken to a gel-like paste.

Example 4

Thickened Composition of 2-Ethyl-1-butanol/ Triethyl Phosphate

Formulation and Materials

For an approximately 666 cm$^3$ batch the following formulation was used:

| Active compounds | |
|---|---|
| Triethyl phosphate (component a1) | 67 cm$^3$ |
| 2-ethyl-1-butanol (component a2) | 67 cm$^3$ |
| Surfactant (compound (b)) Synperonic F127 (TM) | 6.66 grams |
| Co-surfactant Hexan-1-ol | 0.65 cm$^3$ |
| Rheology Control Agent Laponite RD | 26.70 grams |
| Other Water (component (c)) | 533 cm$^3$ |

Method of Preparation

The Synperonic F127 was added to 133 cm$^3$ of the water and was stirred until it became dissolved. This solution and the hexan-1-ol were poured into a plastic beaker. A Silverson high shear mixer was set into the fluid and mixing was commenced. The triethyl phosphate and the 2-ethyl-1-butanol were poured in as a gentle stream to give a white emulsion.

The remaining 400 cm$^3$ of water were put into a plastic beaker and the Silverson high shear mixer was transferred to that beaker. Mixing was commenced and the white emulsion was poured in as a gentle stream.

The Silverson mixer was removed and replaced by a paddle type stirrer. Stirring was rapid, to produce a vortex. The Laponite RD was tapped gently onto the stirred surface, and stirring was continued until some initial thickening was observed. The mix was then transferred to a plastic jar.

Example 5

Unthickened Composition of 2-Ethyl-1-butanol/ Triethyl Phosphate

Formulation and Materials

For an approximately one litre batch the following formulation was used:

| Active compounds | |
|---|---|
| Triethyl phosphate (component a1) | 100 cm$^3$ |
| 2-ethyl-1-butanol (component a2) | 100 cm$^3$ |
| Surfactant (compound (b)) Synperonic F127 (TM) | 10 grams |
| Co-surfactant Hexan-1-ol | 1.0 cm$^3$ |
| Biocide Germaben (TM) | 5 cm$^3$ |
| Other Water (component (c)) | 800 cm$^3$ |

Method and Preparation

The Synperonic F127 was added slowly and with stirring to 200 cm$^3$ of the water in a vessel, and allowed to fully dissolve. The hexan-1-ol was then added. A Silverson high shear mixer was set into the fluid and mixing was commenced. The 2-ethyl-1-butanol was added slowly during the mixing, followed by the triethyl phosphate.

The Germaben was then added into the vortex created by the mixer, to form a white, creamy, emulsion.

The remaining 600 cm³ of water were put into a second vessel with rapid stirring (using a Silverson high shear mixer) to create a vortex. The emulsion previously prepared was poured slowly and gently into the vortex of the water in the second vessel during the stirring.

The Silverson mixer was removed and replaced by a paddle type stirrer. Stirring was continued with the paddle stirrer, sufficiently to ensure good mixing. The finished product will sediment on standing but will not phase separate. The sedimentation can be readily redispersed in the fluid for use, by simple stirring.

Test Results

Yield Stress of the Gel Composition of Example 2 Described Above

The instrument used was a Bohlin CS Rheometer. This is a computer controlled, thermostatted, controlled stress instrument and is capable of carrying out a wide range of rheological measurements.

The rheometer was fitted with a vane. This was dipped directly into a beaker containing the composition. This gelled composition had been covered, with two layers of Clingfilm (R) (thin polyvinyl chloride film), and undisturbed since it was made 24 hours previously.

The yield stress was determined by incrementally increasing the stress applied to the sample. The stress was applied for 2 seconds the sample allowed to recover for 20 seconds. The yield stress was taken, as the stress beyond which the resulting deformation was no longer fully recovered.

The composition had a yield stress in the range 115 to 120 Pa. This is the yield stress for the undisturbed gel. It should be noted that the gel is thixotropic and, as such, the yield stress measured once the sample has been subjected to shearing will be lower and depend upon the time allowed for the gel to recover.

Measured Viscosity as a Function of Shear Rate

The viscosity of a number of samples of the composition was measured on the Bohlin CS rheometer.

Measurements were made using a C14 cup & vane geometry. All samples were thermostatted at 20° C. Having been placed in the rheometer all samples were left for 4 minutes to equilibrate. The viscosity was measured at a range of shear stresses.

The data plotted as viscosity versus shear rate are given in the Figure of the accompanying drawings.

The material shear thins to a high degree. The viscosity decreases from about 160 Pas at a shear rate of $0.3 \text{ s}^{-1}$ to about 0.2 Pas at a shear rate of $520 \text{ s}^{-1}$.

The formulation is thixotropic and so equilibrium viscosity measurements were difficult to achieve. The data in the Figure were obtained for both increasing and decreasing the shear stress.

Comparative Softening Trials

The comparison composition was the commercially available "3M STRIPPER" composition, which is an aqueous-based stripper using dibasic esters, and is believed to be in accordance with EP-A-0294041.

Trial A

Painted door with approximately 6–8 coats of paint. Both the composition of Example 2 (code letters: KS) and the comparison composition (code letters: 3M) were applied at midday and were left overnight.

Results:
  KS Samples 2 and 3: Stripped back with slight remains of primer coat.
  KS Sample 4: Stripped back to bare wood.
  3M: Completely dried out overnight but had removed 2 coats of paint. The door needed a further 2 applications before reaching bare wood. Separation of 3M product was noted after the overnight treatment.

Note: KS Samples 2 and 3 were prepared as described above. Sample 4 was prepared with faster stirring and the hexan-1-ol added before the DMA.

Trial B

Table-top coated with "Kwik-Finish" water-based finish (5 coats). "Kwik-Finish" is a heat- and water-resistant acrylic lacquer finish, which is normally very difficult to remove. Both the composition of Example 2 (code letters: KS) and the comparison composition (code letters: 3M) were applied as described.

Results:
  KS Sample: Removed 3 coats after 40 minutes and the remaining two coats after a further 40 minutes back to bare wood.
  3M: Removed 2 coats after 40 minutes and after a further 40 minutes not back to wood. A further two applications were required to achieve bare wood.

Trial C

Motorcycle petrol tank painted with baked-on finish. Both the composition of Example 2 (code letters: KS) and the comparison composition (code letters: 3M) were applied at 5 pm and left overnight.

Results:
  KS Sample: Removed the top coat.
  3M: No effect. Separation of the 3M product was noted after the overnight treatment.

Trial D

Acrylic paint on wood. Both the composition of Example 4 (code letters: ECO) and the comparison composition (code letters: 3M) were applied and the time to soften the paint down to the wood was measured.

Results:
  ECO: 40 minutes
  3M: 65 minutes

Trial E c. 60 year old varnish on wood. Both the composition of Example 4 (code letters: ECO) and he comparison composition (code letters: 3M) were applied and the time to soften the varnish down to the wood was measured.

Results:
  ECO: 35 minutes
  3M: 60 minutes

Trial F

Multi-layered paint on wood. Both the composition of Example 4 (code letters: ECO) and the comparison composition (code letters: 3M) were applied and left overnight. The extent of softening was then assessed and a second application of the compositions made. The time to soften the paint down to the wood was measured.

Results:
  ECO: Overnight trial took the multilayered paint down to the primer coat on the wood. Subsequent reapplication of the composition took the primer coat to the wood in 60 minutes.
  3M: Overnight trial removed 2–3 layers of the multilayered paint but did not reach the primer coat on the wood. A first subsequent reapplication of the comparison composition took the remaining paint layers down to the primer coat on the wood in 60 minutes, but a further reapplication of the comparison composition was needed, which took the primer coat to the wood in a further 20 minutes.

Trial G

Pre-catalyst ("pre-cat") and Acid Catalyst ("A/C") lacquer on wood. This is a hard lacquer which is normally difficult to remove. Both the composition of Example 4 (code letters: ECO) and the comparison composition (code letters: 3M) were applied and the time to soften the lacquer down to the wood was measured.

Results:

ECO: 60 minutes

3M: Softening effect was patchy after 60 minutes. A second coat of comparison composition was then applied, and the lacquer was softened down to wood after a further 40 minutes.

SUMMARY

On the basis of the above, and similar, trials, it is found that the compositions of Examples 1 and 2 have universal utility against a wide range of coatings, and particularly paint; the composition of Example 3 is particularly effective against varnishes and lacquers; and the compositions of Examples 4 and 5 have universal utility against a wide range of coatings, particularly paint and varnishes.

What is claimed is:

1. An aqueous emulsion composition for plasticizing or softening paint, varnish and similar coatings prior to stripping the coating from a surface, the composition comprising:

(a) a emulsified hydrophobic phase comprising a plasticizing/softening mixture, (b) an effective amount of at least one water-soluble block copolymer surfactant of more than one alkylene oxide to stabilize the emulsion, (c) an aqueous phase including water in an amount sufficient to comprise the major portion of the composition; and said emulsified hydrophobic phase suspended in the aqueous phase, the hydrophobic phase including components (a1) and (a2) as defined below:

(a1) at least one compound of formula I:

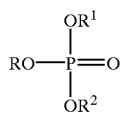

(I)

wherein R, $R^1$ and $R^2$, which may be the same or different, represent unsubstituted mono-substituted or poly-substituted $C_{1-8}$ alkyl, phenyl or ($C_{1-8}$-alkyl)-phenyl groups; and (a2) about 4% to about 10% by weight of total composition of at least one unsubstituted mono-substituted or poly-substituted $C_{1-8}$ alkyl ester of a $C_{2-20}$ carboxylic acid; or about 4% to about 10% by weight of the total composition of at least one $C_{4-12}$ alkanol;

wherein said mono-substituted or poly-substituted $C_{1-8}$ alkyl consist of one or more substitutents selected from the group consisting of halo, nitro, amino, $C_{1-4}$ alkylamino, di-$C_{1-4}$ alkylamino, hydroxy, $C_{1-4}$ alkoxy, carboxy, ($C_{1-4}$ alkyl)carbonyl, ($C_{1-4}$ alkoxy)-carbonyl, $C_{2-4}$ alkanoyloxy, ($C_{1-4}$ alkyl) carbamoyl, aryl, cycloalkyl and salts thereof.

2. A composition according to claim 1, in which the hydrophobic phase consists essentially of components (a1) and (a2).

3. A composition according to claim 1, in which components (a1) and (a2) are present in such concentrations that they exist in a partitioned state between the hydrophobic and aqueous phases.

4. A composition according to claim 1, in which (a1) is present in an amount of about 10% by weight of total composition and (a2) is present in an amount of between about 4 and 10% by weight of total composition.

5. A composition according to claim 1, in which (a1) is triethylphosphate.

6. A composition according to claim 1, in which (a2) is an alkyl ester of a filly or partially saturated straight-chain mono-, di- or tri-basic carboxylic acid, the alkyl portions being optionally mono- or poly-substituted.

7. A composition according to claim 6, in which the carboxylic acid is a $C_{2-10}$ alkanoic, alkanedioic or alkanetrioic acid.

8. A composition according to claim 6, in which (a2) is dimethyl adipate, 1,2,3-propanetriol triacetate, tri-n-butyl citrate, n-octyl acetate, methyl octanoate or mixtures thereof.

9. A composition according to claim 1, win which (a2) comprises a branched $C_{4-10}$ alkanol.

10. A composition according to claim 9, in which the alkanol is an alkan-1-ol having one hydroxyl function and at least one alkyl side chain at the 2-position.

11. A composition according to claim 9, in which the alkanol is 2-ethyl-1-butanol.

12. A composition according to claim 1, in which the surfactant comprises a block copolymer of ethylene oxide and propylene oxide.

13. A composition according to claim 12, in which the block copolymer of ethylene oxide and propylene oxide has an approximate molecular weight in the range of 8000 to 16000.

14. A composition according to claim 13, in which the proportion (x) of the polyoxyethylene hydrophile in the copolymer (expressed as a percentage by weight) is approximately related to the molecular weight (y) of the polyoxypropylene hydrophobe by the formula:

$$y \geq 5000 - 40x.$$

15. A composition according to claim 1, in which the surfactant is used in conjunction with a $C_{1-10}$ alkyl alcohol as a cosurfactant.

16. A composition according to claim 1, in which a rheology control agent is further present to cause the composition to be in the form of a thixotropic gel or gel-like paste.

17. A composition according to claim 16, in which the rheology control agent comprises a synthetic smectic clay composed of layered hydrous magnesium silicate free from crystalline silica.

18. A composition according to claim 1, in which the water comprises at least 60% by weight and/or volume of the composition.

19. A composition according to claim 18, in which the water comprises at least 70% by weight and/or volume of the composition.

20. The method of preparing an aqueous composition according to claim 1 for plasticising or softening paint, varnish and similar coatings prior to stripping the coating from the surface, the method comprising admixing, with an aqueous phase comprising water in an amount sufficient to comprise the major portion of the composition, said block copolymer surfactant and hydrophobic phase including components (a1) and (a2) so that the hydrophobic phase forms an emulsion suspended in the aqueous phase.

21. The method of claim 20, including adding the surfactant before the hydrophobic phase.

22. A method according to claim 20, in which a cosurfactant is added before the hydrophobic phase.

23. A method according to claim 20, in which the less soluble compound of components (a1) and (a2) is added first to at least some of the water and said surfactant components, until an emulsion is formed, and then the more soluble compound of components (a1) and (a2) and any required further water are added.

24. A method according to claim 20, in which the composition is stirred during the mixing.

25. A method of plasticising or softening paint, varnish and similar coatings prior to stripping the coating from a surface, the method comprising applying to the coating the composition of claim 1.

* * * * *